US005517708A

United States Patent [19]

Baranowski

[11] Patent Number: 5,517,708

[45] Date of Patent: May 21, 1996

[54] COMMUNITY PATHWAY ACCESS SYSTEM FOR WHEELCHAIR USERS

[76] Inventor: Edwin M. Baranowski, 75 Marrus Dr., Gahanna, Ohio 43230

[21] Appl. No.: 243,565

[22] Filed: May 16, 1994

Related U.S. Application Data

[63] Continuation-in-part of Ser. No. 826,838, Jan. 27, 1992, Pat. No. 5,319,818, and Ser. No. 86,252, Jul. 1, 1993, Pat. No. 5,402,546.

[51] Int. Cl.[6] .................... B65G 69/28

[52] U.S. Cl. .................... 14/69.5; 14/71.1; 414/921; 414/537

[58] Field of Search .................... 14/69.5, 71.1; 414/522, 537, 538, 539, 921

[56] References Cited

U.S. PATENT DOCUMENTS 3,510,015 5/1970 Roshaven .................... 414/537

4,528,711 7/1985 Packer .................... 14/69.5

4,853,999 8/1989 Smith .................... 14/69.5

4,874,284 10/1989 New, Jr. .................... 414/537

5,035,565 7/1991 White .................... 14/69.5

*Primary Examiner*—Ramon S. Britts
*Assistant Examiner*—Pamela A. O'Connor

[57] ABSTRACT

An access pathway is provided as a device that may be temporarily or portably deployed for wheelchair users accompanied by an assistant. The device, which is a pathway that may be carried by the user or provided at a site when required, is installed in cooperation with a pre-existing anchor at the site, and may be subject to temporary loan, such as from a central community service provider or a library. A convenient and inexpensive system is thus provided that achieves wheelchair access in many circumstances.

12 Claims, 5 Drawing Sheets

COMMUNITY PATHWAY ACCESS SYSTEM FOR WHEELCHAIR USERS

RELATED APPLICATIONS

This is a continuation-in-pad of my prior applications, Ser. No. 07/826,838, filed Jan. 27, 1992 now U.S. Pat. No. 5,319,818, and Ser. No. 08/086,252 filed Jul. 1, 1993, now U.S. Pat. No. 5,402,546, which in their entirety are incorporated by reference herein

FIELD OF THE INVENTION

This invention relates to stairway accessibility means for wheelchair challenged persons. In particular, the invention provides temporary and portable access over a limited stairway barrier for wheelchair users. The device does not encumber or obstruct a stairway, is easily installed and removed, and may be subject to temporary lending, such as from a central community service, a library, supermarket or other community facility. The device achieves wheelchair access over limited stairway barriers in many circumstances, including locations that may otherwise be considered exempt from the Americans with Disabilities Act.

BACKGROUND OF THE INVENTION

My referenced U.S. Pat. No. 5,402,546, describes problems of accessibility encountered by wheelchair users. Social gatherings at private homes are a typical exemption to requirements imposed by law for wheelchair access. In other instances also, a part of a building, such as the entrance, is accessible to wheelchairs, but because stair barriers occur between "split" levels or platform elevations, access from the outside does not equate to full access inside. Cost and space limitations may also prevent complete interior access by wheelchairs.

The prior art of ramps, lifts, elevators and the like generally relates to the provision of "barrier free" accessibility for singly independent wheelchair challenged persons. Such devices are most appropriate for new construction and significant renovation of existing structures.

Many wheelchair challenged persons are not singly independent and may require varying degrees of assistance in different tasks. And in many applications, wheelchair access is not required 100% of the time; or the scale of a facility or residence does not, or resources available, do not, warrant the renovation or expense that installation of a permanent ramp, lift or elevator entails. In other instances, ramps and elevators require space that may not be available. Typical examples of wheelchair access circumstances in which the present device is useful include the occasional visitation of a wheelchair challenged person to family or friends' residences, or business or social gatherings at private residences. Such visitations and gatherings may be considered "community" gatherings.

The invention permits broadened wheelchair access to places, businesses, facilities, homes and locations of ordinary living activities where conventional ramp or elevator or lift systems may not be required, or may be impractical because of space, infrequent use, or financial considerations. The device may be conveniently mass produced for such community applications and provided for use as an ordinary, standardized houseware.

OBJECTS OF THE INVENTION

It is an object of the invention to provide a portable or temporarily installed wheelchair access means. It is an object to provide an access appliance that can be sold as a widely available "housewares" type of device (inexpensive and sold at supermarkets, department, drug and discount stores and other mainstream retail outlets) which provides a portable access means. The device can be carded by the wheelchair user, or provided at a residence or location at little expense, upon the visit of a wheelchair challenged person.

It is a further object to provide a simple and low cost device that is less expensive than a conventional ramp or lift, does not require dedicated space, is non-intrusive, and provides advantages over conventional ramp systems for the assisted transit of a wheelchair.

These and other objects of the invention will be more readily understood when the specification is considered in conjunction with the accompanying drawings:

DESCRIPTION OF THE PREFERRED EMBODIMENT

The invention provides a portable and temporary pathway for the transit of a wheelchair over a stair barrier. The pathway is readily installed and easily deployed and is preferably provided in standardized "community" sizes.

Figure 1:
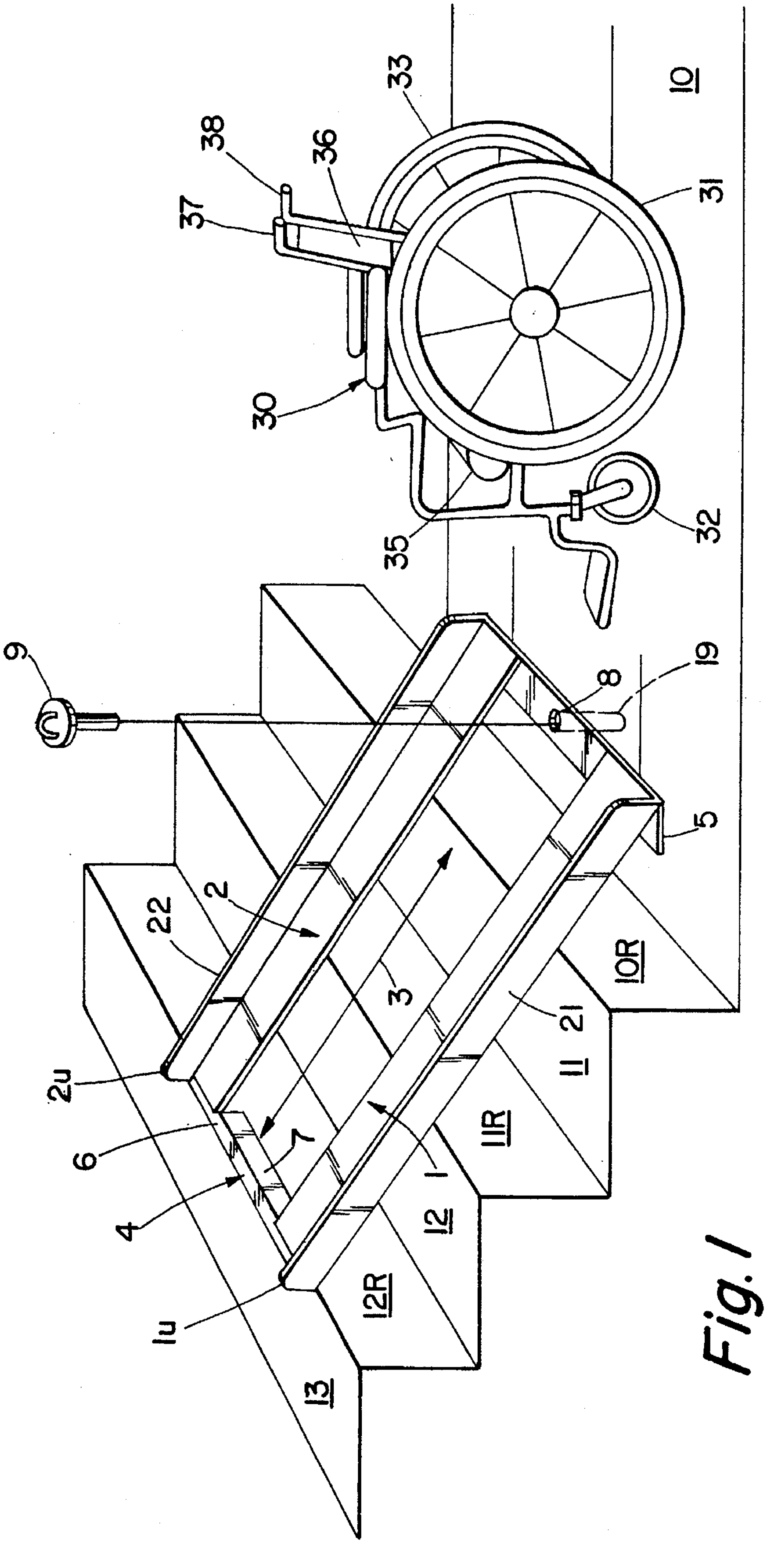
FIG. 1 shows in perspective the invention installed at a stairway.

As illustrated in FIG. 1, the appliance includes parallel extended tracks 1 and 2 which are sufficiently wide so as to be capable of receiving thereon the front and rear wheels on either side of a conventional four-wheel wheelchair. (With suitable modifications, a "tripod" type of chair may be accommodated.) The upper surface of the tracks should be slip-resistant, or include thereon, or be formed from, a traction enhancing material. The surface tracks are separated such that a "step through" path 3 is allowed for an assistant when the tracks are placed across a barrier. The tracks are maintained in their spaced apart and parallel relationship by lateral spacer and connector members 4 and 5, respectively at the upper and lower ends of the tracks. Optional side curbs on the tracks shown at 21 and 22 prevent the wheelchair from deviating from the tracks during its transit thereover.

In FIG. 1, the device is installed at a stairway barrier leading up or down, from or to, lower level 10 and upper level 13. There are two stairs with treads 11 and 12, leading through risers 10R, 11R and 12R, from lower level 10 to the upper level 13. A conventional wheelchair is shown at 30 having rear 31 and front 32 wheels on one side paired with rear 33 and front 34 (not shown) wheels on the other side.

The wheelchair includes seat 35, back 36, and pushing or guiding handles for an assistant at 37 and 38.

Because the pathways are separated, the mechanical advantage of an inclined plane for the wheelchair, and unobstructed stair access for the assistant who guides the wheelchair up or down the pathway, are provided. Because the pathways are temporary, the stairway is not permanently changed, and a "ramp" does not interfere with access by persons with other disabilities, such as persons using canes or walkers or the visually challenged. In addition, the two separated tracks promote visual alignment of the wheelchair wheels on the tracks. By sight and footing, the "comfort" level created in the wheelchair user and an assistant in using the device is improved over that of a ramp when used at stair inclines.

The pathway assembly is secured to a support adjacent the stairway. Preferably, this is accomplished by a multiple point support system. With reference to FIG. 1, the upper lateral member 4 connecting the parallel pathways is right angled in configuration, having a flat upper surface 6 that is parallel to and rests upon the flat surface of upper level 13. The front edge 7 of the lateral member abuts against the front edge of the riser 12R. In so doing, front edge 7 aligns the parallel pathways in a perpendicular direction with reference to the direction of the stairs.

In the depiction of FIG. 1, the lower lateral member 5 joining the pathways includes therein a hole 8 for receiving therethrough a removable anchor pin 9, for securing the lower member to corresponding anchor receptacle 19 in the lower surface. In this manner, a three point support for the pathways is formed at points located proximate the upper ends **1*u* and 2*u* of pathways 1 and 2, and at 8, which is secured by pin 9 to anchor 19 as shown in FIG. 1**.

Figure 3:
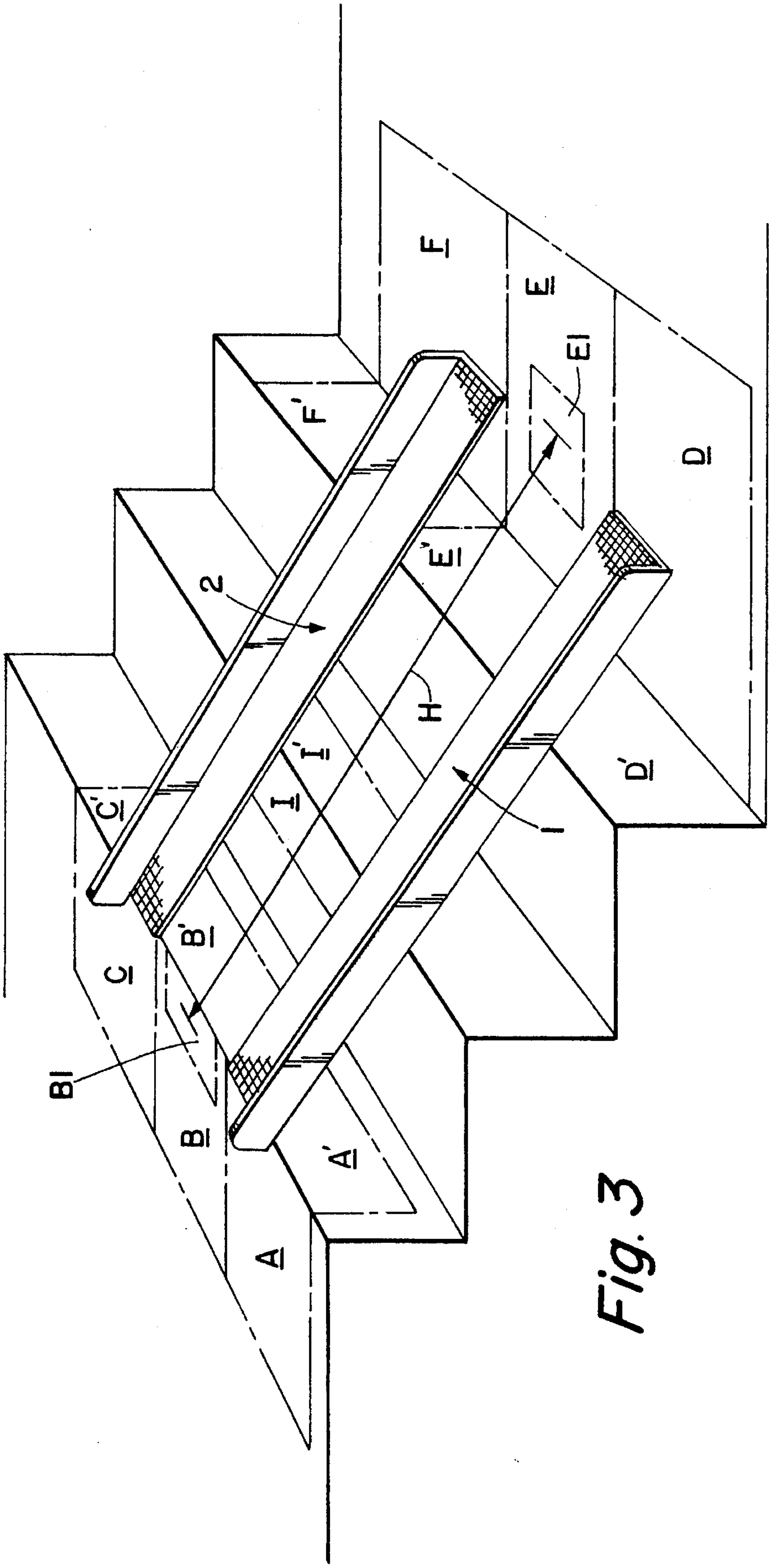
FIG. 3 shows support zone areas useful in securing the invention at a particular location.

With reference to FIG. 3, the support arrangement for the device may include points at each side of the upper and lower ends of the pathways, in areas A, B, C, D, E and F. For example, a triangulated support may be formed at points in areas A, C and E or D, F and B. Likewise, a three pointed support is formed at areas D, F and B', namely the lower ends of the tracks and the middle of the perpendicular front section 7 of the upper lateral connector 5. The combinations and permutations of the support points selected are matters of design choice. For example, an intermediate right angled lateral connector may be included centrally or otherwise along the length of the pathways, such as at areas I or I' for connection with a support pin. The configuration shown in FIG. 1 with a bottom support anchor pin at 8 in the lower lateral member 5, combined with an upper right angle support 4 that abuts against the upper stair is a simple triangulation. Such a device is simply manufactured and is easily installed by first securing the lower section through anchor point 8 and dropping the upper spacer section 4 to rest upon the upper level and/or to abut the stair riser.

The anchor pin may be and/or include a pin, screw, latch, hook, cam or other securing mechanism. With reference to the support zones shown in FIG. 3, an anchor mechanism may be placed in the center sections of the connector members, or be included in outward or lateral extensions from the sides of the pathways.

Figure 4A:
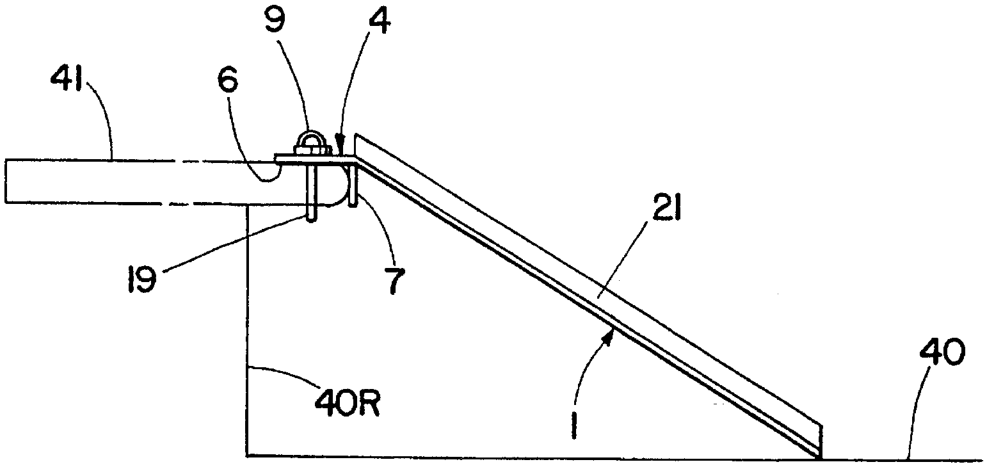
FIGS. 4A and 4B respectively show, in a side view and a plan view, an adaptation of the device useful in a single step "split level" environment.
Figure 4B:
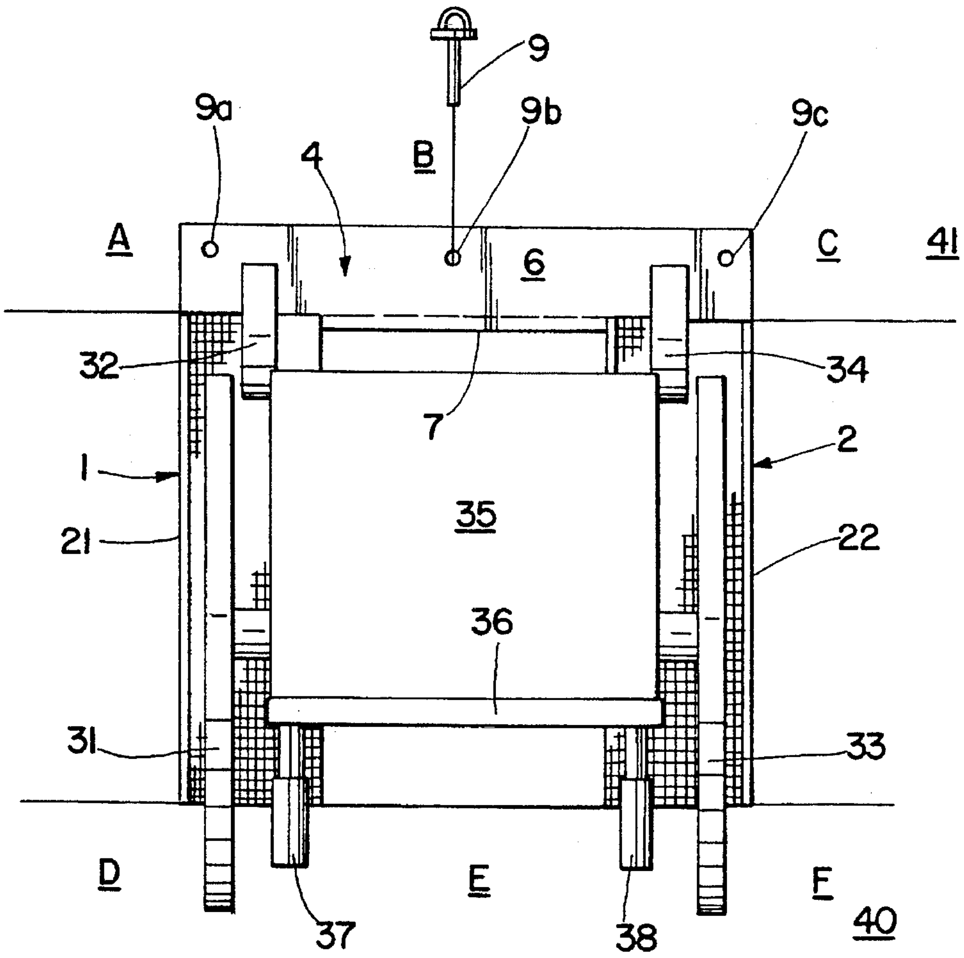

The device is preferably suited to applications traversing conventional grade elevations of approximately two, three or four or more stairs which lead to a raised interior floor level from a "ground" level. Similarly, the interiors of many private homes are split level or have floors separated by a stair or stairs. Such environments are suitable candidates for use of the invention. Even where there is a single stair barrier, and the "tilt-back/push-forward" wheelchair maneuver with an assistant can be used, the advantages of the device, in a variation shown in FIGS. 4A and 4B, can nevertheless be realized. In the side view of FIG. 4A, a lower floor level 40 adjoins upper split level 41 through riser 40R. The pathway 1, having side curb 21, upper element 4 with perpendicular top 6 and front 7 sections, is temporarily secured during use by anchor 9 inserted through and into anchor holes 8 and 19, as described above. Numeral indicators in the top view of FIG. 4B similarly correspond to elements identified above. In FIG. 4B, a triangulated support for the device is alternatively defined at points in areas A E C or D B F. Alternate locations for anchor pins are shown in areas A and C. If an anchor point is not located centrally, as at **9*b* in area B, it is preferred that two points adjacent either the upper or lower ends of the paths in zones A and C or zones D and F be employed to prevent slipping or wobbling such as at 9*a* and 9*c* or points in an intermediate or lower location that correspond to points 9*a*, 9*b* or 9*c***. A light weight, inexpensive appliance thus provides an optimum temporary access system.

Typical applications of the device are illustrated in the Examples below:

EXAMPLE I

A university or college is otherwise in compliance with mandated wheelchair access requirements. Frequently, however, in the spirit of an extended academic community, faculty members may hold seminars, meetings or social gatherings in their private homes, which may not be wheelchair accessible. This lack of access may deter a wheelchair challenged person from participation in these community activities. In the foreseeable need for wheelchair access, the faculty member will have installed at the stair barrier location a suitable anchor hole, such as that shown at 19 in FIGS. 1 and 2 for receiving a securing pin, such as 9 for a pathway that can then be securely installed when required for access by a wheelchair challenged person at a particular event. The anchor point for the pathway is "invisible" or otherwise unobtrusive when not used. Installation and removal of the pathway should take no more than about five minutes.

The library or the buildings and grounds or maintenance department of the college or university will maintain in stock, for occasional loan, the pathways of the invention; the wheelchair challenged person may provide his/her own pathway; or the gathering host may permanently maintain a pathway, tailored to the specific stairway, as a household accoutrement. The only permanent change or addition required to provide the pathway is a small and inconspicuous anchor plate, receptacle or hole in or adjacent the stair path. The equivalent of a "hole" may include upwardly extending pins. If an upwardly extending anchor is provided, it should be preferably positioned so as not to obstruct stairway access, preferably at the sides of the pathways, e.g. in the sections of zones A, C, D and F illustrated in FIG. 3 which extend beyond the pathways.

EXAMPLE II

A wheelchair challenged person is employed by a business firm or institution. Frequently, management executives entertain at their homes, and oftentimes co-workers gather at each others' residences for social events. Without an easy access means, the wheelchair challenged person may not be included in these events, or because of the awkwardness, embarrassment or inconvenience associated with a conventional manner of overcoming stairs (being carded), may not participate. Depending on the frequency of management gatherings at private residences, the firm manager will include among his/her household appliances a device of the invention for deployment at social gatherings to accommodate wheelchair challenged persons. The firm may otherwise make available for loan to facilitate the full social participation of the wheelchair challenged in other co-worker social events. The only adaptation required at a residence is an anchor point for the pathway, preferably located in accordance with a standard firm specification adapted to the specific pathway.

EXAMPLE III

A planned community, a community of manufactured homes, or a condominium or apartment complex, at the stairway to each residence, will standardize the location for an anchor point for each residence. A pathway will be correspondingly standardized. Residents will be offered the pathways at purchase or at the beginning of their tenancies, or a pathway adapted to the standardized configuration can be made available on loan from a community or management office.

EXAMPLE IV

A real estate agent, or the company of a real estate agent, provides an anchor point for temporarily anchoring the device at a residential, commercial or investment property. The property can then be easily shown to wheelchair challenged customers.

EXAMPLE V

Standardized access pathways may be made a building code requirement for all structures in a particular governmental jurisdiction.

Figures 2, 2A:
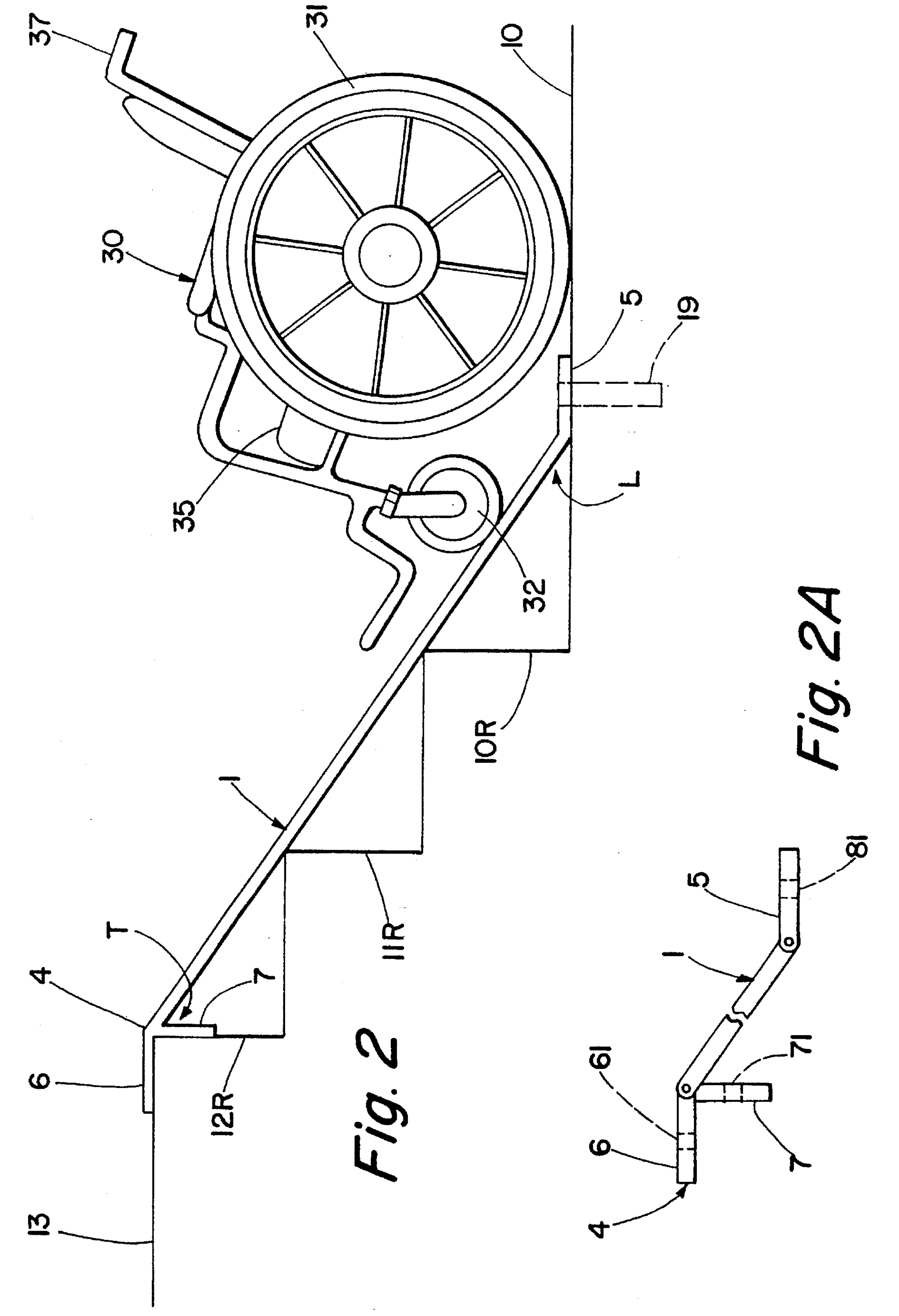
FIG. 2 depicts a side view of the pathway device.
FIG. 2A is a detail view of an alternative hinged configuration adaptable to different stairways.

With reference to FIG. 2, a side view of an installation is shown, including pathway 1 connecting lower level 10 to upper level 13. In this view, there is shown wheelchair 30, having on the side shown rear wheel 31 and front wheel 32, seat for an occupant 35, and grip handles 37 for an assistant to push (upward direction) or restrain (downward direction) movement of the chair. To the extent that the device is intended for use at a same stairway location, or with identical stairways, such as in Example III, the length of the pathway 1, and the angle T between the pathway 1 and the top section 6 of upper member 4 and the angle L between pathway 1 and lower member 5 can be predetermined and fixed.

Figure 5:
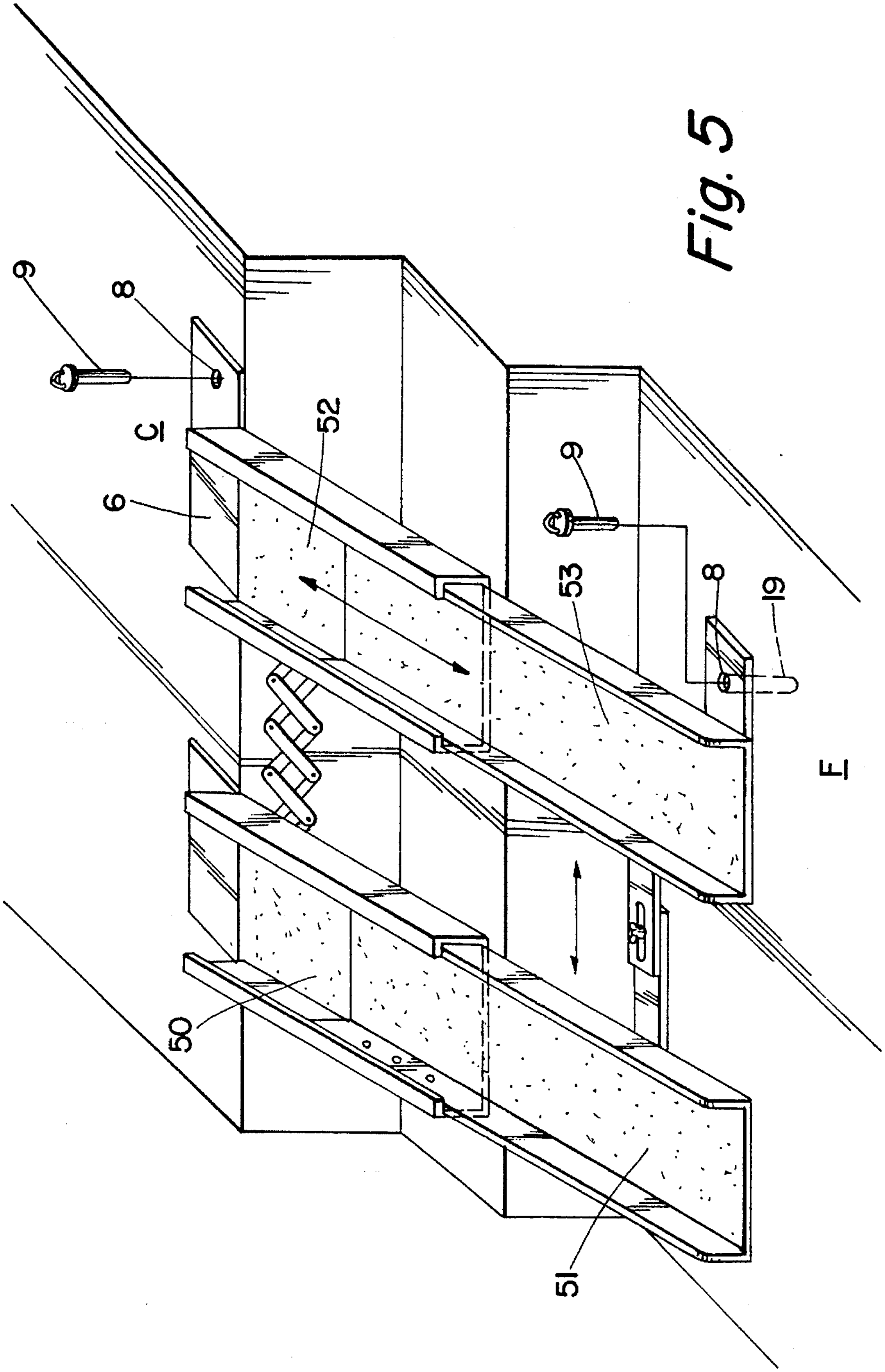
FIG. 5 shows an extensible or adjustable variation of the device.

To the extent that the pathway is intended for use with different stairways, it is preferably extensible and retractable in length, such as, for example to be provided in sizes for two and three stairs, three and four stairs, or other sizes. FIG. 5 shows such an adjustable pathway comprised of internally slidable cooperating sections, 50 and 51, and 52 and 53. Preferably, however, the angles T and L need to be adaptable over only a limited range to accommodate the different installations. Thus, the pathway may be provided in different modular sizes (or in "cut to need size" versions) for different ranges of stairway lengths.

In use, the pathway in all variations should preferably span each stair as the hypotenuse of a triangle having sides determined by the riser and treads of the stairs. In this manner, the upper front of each stair tread will be in supporting contact with the bottom of the pathway at relatively short intervals, reducing the strength requirements for, and consequently the weight of, the device. Given reality, however, this circumstance may not be realized; and a compromise sizing is required.

As the device is provided as an appliance, it should be easily "sized" for its intended location. Further, with the stairway tread hypotenuse reference point, a standardized location for an anchor point at the lower level may be determined as shown in FIG. 3, in region E1, which includes an area in front of, on or behind the intersection of the hypotenuse line with the lower surface level. An evident preferred lateral location for an anchor point is in the middle of the stairway. Alteratively, a standardized anchor point may be provided in zone B at region B 1. This latter location is suitable for a modular pathway of a single fixed length as long as or longer than the length of a straight line extending from the upper level to the lower level as shown in hypotenuse line H in FIG. 3.

In FIG. 2A, a hinged variation is shown in which pathway 1 is hinged at either or both upper or lower ends to connecting members 4 and/or 5. Anchor points as otherwise described above are at 81, 61 or 71.

The dimensions and proportions and the materials of fabrication depend on design considerations of durability, weight, public or institutional use, or other considerations, provided however, that good design criteria for the wheelchair application, given the foregoing disclosure, are satisfied.

What is claimed is:

1. A wheelchair access system comprising:

a wheelchair pathway including an anchor device (8,9) at a predetermined position therein adapted to cooperate with an extraneous anchor means (19) thereby securing the pathway over a barrier of stairs within a community;

at least one said anchor means (19) installed at a barrier of stairs, and wherein said anchor device (8,9) includes at least one anchor plate (8) having a common location with respect to each barrier of stairs for temporarily securing a wheelchair pathway over a barrier of stairs, wherein the barrier of stairs connects an upper level with a lower lever; and the anchor device comprising a connector (9) cooperating with the anchor plate (8) of the pathway, and said connector (9) further cooperating with said anchor means (19) which is at a predetermined location adjacent the barrier of stairs.

2. The system of claim 1 in which the pathway includes a track having a curb upwardly extending from a side edge thereof.

3. The system of claim 1 in which the connector is right angled in shape and one side of the right angled member is adapted to be disposed upon the upper level.

4. The system of claim 1 in which the barrier of stairs includes stair risers and stair treads and a lateral connector is formed in a shape disposed to abut one of the front of a stair riser and a stair tread.

5. The system of claim 1 in which in the pathway a lateral connector extends between the lower sections of the pathway and is adapted to be disposed upon the lower level when the pathway is deployed.

6. The system of claim 1 in which the anchor device for temporarily securing the pathway includes means comprising at least one of a receptacle, hole, a pin, a screw, a latch, a hook, a cam or a connector.

7. The system of claim 1 in which the anchor means is located laterally in the center zone of the barrier of stairs.

8. The system of claim 1 in which the anchor means is located laterally with respect to the barrier of stairs at a side edge of the pathway.

9. The system of claim 1 in which the anchor means is located behind the point and is positioned laterally at a point on the upper level behind the intersection of the pathway with the upper level.

10. The system of claim 1 in which the connector is adapted to operatively engage with means including at least one of a receptacle, hole, pin, screw, latch, hook, or cam.

11. The system of claim 1 in which the pathway comprises parallel tracks that are adjustable with respect to at least one of length and separation distance.

12. The system of claim 1 in which the pathway comprises parallel tracks that are adjustable with respect to length and separation distance.

* * * * *